Patented May 2, 1950

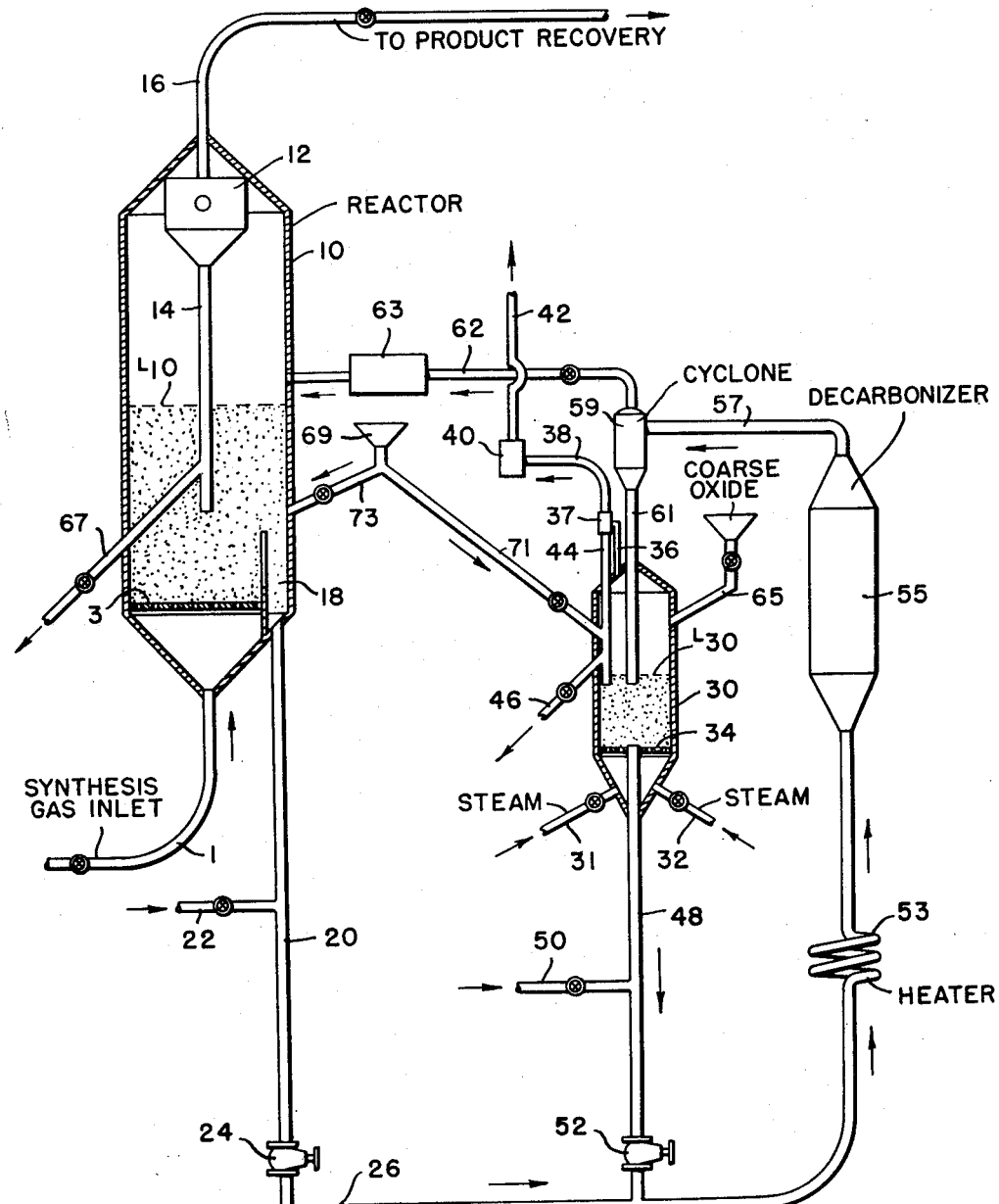

2,506,302

UNITED STATES PATENT OFFICE 2,506,302

METHOD FOR REGENERATION OF A HYDROCARBON SYNTHESIS CATALYST

Robert W. Krebs, Baton Rouge, La., assignor to Standard Oil Development Company, a corporation of Delaware Application June 30, 1947, Serial No. 758,207

21 Claims. (Cl. 260—449.6)

This invention relates to the catalytic conversion of carbon oxides with hydrogen to form valuable synthetic products. The invention is more particularly concerned with an improved method of employing and reconditioning finely divided catalysts having a high activity and selectivity for the formation of normally liquid hydrocarbons in the catalytic conversion of carbon monoxide with hydrogen employing the so-called fluid solids technique.

The synthetic production of liquid hydrocarbons from gas mixtures containing various proportions of carbon monoxide and hydrogen is already known and numerous catalysts, usually containing an iron group metal, have been described which are specifically active in promoting the desired reactions at certain preferred operating conditions. For example, cobalt supported on an inert carrier is used when relatively low pressures (atmospheric to about 5 atmospheres) and low temperatures (about 375–425° F.) are applied in the manufacture of a substantially saturated hydrocarbon product, while at the higher temperatures (about 450–750° F.) and higher pressures (about 5–25 atmospheres and higher) required for the production of unsaturated and branched-chain products of high anti-knock value, iron-type catalysts are more suitable.

In both cases, the reaction is strongly exothermic and the utility of the catalyst declines steadily in the course of the reaction chiefly due to the deposition of non-volatile conversion products such as carbon, paraffin wax, and the like, on the catalyst.

The extremely exothermic character and high temperature sensitivity of the synthesis reaction and the relatively rapid catalyst deactivation have led, in recent years, to the application of the so-called fluid solids technique wherein the synthesis gas is contacted with a turbulent bed of finely divided catalyst fluidized by the gaseous reactants and products. This technique permits continuous catalyst replacement and greatly improved heat dissipation and temperature control.

However, the adaptation of the hydrocarbon synthesis to the fluid solids technique has encountered serious difficulties particularly with respect to catalyst deposits and their detrimental effects on the fluidization characteristics and mechanical strength of the catalyst.

As stated above, one of the most important modifications of the hydrocarbon synthesis requires the use of iron-type catalysts. These catalysts are the outstanding representatives of a group of catalysts which combine a high synthesizing activity and selectivity toward normally liquid products with a strong tendency to carbonize during the synthesis reaction, that is, to form fixed carbon or coke-like catalyst deposits which cannot be readily removed by conventional methods of synthesis catalyst regeneration such as extraction, reduction, steam-treating or the like.

These carbon deposits, when allowed to accumulate, weaken the catalyst structure, probably due to carbide formation which leads to rapid catalyst disintegration particularly in fluid operation. The reduction of the true density of the catalyst resulting from its high content of low-density carbon coupled with the rapid disintegration of the catalyst particles causes the fluidized catalyst bed to expand, thereby reducing its concentration of catalyst and ultimately resulting in the loss of the catalyst bed because it becomes impossible to hold the catalyst in a dense phase at otherwise similar fluidization conditions. With these changes in fluid bed characteristics, the heat transfer from and throughout the bed decreases markedly favoring further carbonization and accelerating the deterioration of the fluidity characteristics of the bed.

Prior to the present invention it has been suggested to reduce the carbon content of catalysts of this type by withdrawing the carbonized catalyst and subjecting it to an oxidation reaction with an oxidizing gas such as air, oxygen, carbon oxides, steam, or the like, or mixtures of such oxidizing gases whereby the carbon is converted into carbon oxides. However, it is extremely difficult to control the oxidation conditions of procedures of this type so as to remove a substantial proportion of the carbon without simultaneously oxidizing the catalyst itself. It has, therefore, been normally necessary to subject the decarbonized catalyst to a subsequent reduction treatment before the catalyst is returned to the synthesis reactor.

The present invention overcomes the aforementioned difficulties and affords various additional advantages. These advantages, the nature of the invention and the manner in which it is carried out will be fully understood from the following description thereof read with reference to the accompanying drawing.

In accordance with the present invention the carbon content of carbonized synthesis catalysts is substantially reduced or completely removed by intimately contacting the carbonized catalyst with a metal oxide reducible by carbon at a temperature below the fusion temperature of the catalyst and maintaining a contacting temperature conducive to a selective reaction of the oxygen of the metal oxide with the carbon of the carbonized catalyst so as to remove the carbon from the catalyst in the form of carbon oxides and simultaneously to reduce the metal oxide contacted with the catalyst. In this manner an oxidation of the synthesis catalyst during the decarbonization treatment is avoided and the requirement of a separate reduction stage for reducing the decarbonized catalyst is eliminated.

Various readily reducible metal oxides such as the oxides of iron, nickel, manganese, titanium, vanadium, cobalt, chromium, molybdenum, copper, or mixtures of such oxides are suitable for the purpose of the invention. In accordance with a preferred embodiment of the invention, however, the synthesis catalyst itself is used in the unreduced state as the decarbonizing metal oxide. This embodiment of the invention has the advantage that no separation of reduced metal oxide and decarbonized catalyst will be required prior to the re-use of the decarbonized catalyst in the synthesis reactor while such a separation may be necessary when metal oxides are used which adversely affect the synthesis reaction, as for example, nickel oxide.

The amounts of metal oxides required may, of course, vary within wide limits mainly depending on the amounts of carbon to be removed from the synthesis catalyst and the character of the metal oxide itself. Quite generally it may be stated that the metal oxide should be used in such amounts as to make an excess of oxygen available over that theoretically required to remove the desired amount of carbon. More specifically when using $Fe_2O_3$ as the metal oxide to reduce the carbon content of an iron catalyst from about 35% by weight to about 5% by weight the amount of $Fe_2O_3$ required will be about 2 lbs. per pound of catalyst to be decarbonized, which corresponds to an oxygen excess of about 22%. It has also been found desirable to take care that the carbonized catalyst to be decarbonized in contact with the metal oxide contains a limited amount of oxygen, say about 5-20% by weight of the catalytically active metal component, in the form of an oxide of that component. This oxygen combined with the active catalyst component greatly assists in starting up the decarbonization reaction in contact with the extraneous metal oxide.

The decarbonization temperatures suitable for the process of the invention may fall within the approximate limits of from 1000° to 2000° F. depending on the metal oxide and catalyst used. More specifically when $Fe_2O_3$ is used as the metal oxide, decarbonizing temperatures of 1200° to 1400° F. are suitable for iron catalysts. The heat required by the decarbonization reaction may be supplied in any suitable manner, for instance, by passing a sufficiently pre-heated gas such as steam, flue gas, or other inert gas through the mixture of carbonized catalyst and metal oxide or the heat may be supplied to the decarbonization zone immediately by indirect heat exchange in any conventional manner. In accordance with a third method a controlled combustion of a preferably gaseous fuel such as synthesis tail gas or the like with a limited amount of air may be carried out within the decarbonizing zone under overall nonoxidizing conditions.

When a metal oxide is used as such or in the reduced stage which does not adversely affect the synthesis reaction, for example when the unreduced synthesis catalyst itself is used to supply the metal oxide, the reduced metal oxide may be returned together with the decarbonized catalyst to the synthesis reaction and reoxidized under the normally oxidizing conditions of the synthesis reaction to re-form metal oxide in sufficient amounts to be useful for a subsequent decarbonization reaction in accordance with the invention. When metal oxides are used which adversely affect the synthesis reaction they must be substantially completely separated from the decarbonized catalyst prior to the return of the latter to the synthesis reaction. In this case a separate oxidation zone must be provided in which the reduced metal oxide may be contacted with an oxidizing gas such as steam, air, oxygen or mixtures thereof to regenerate the metal oxide for the decarbonization treatment. It will be understood, of course, that such separate oxidation zone may also be used to reoxidize metal oxides which do not adversely affect the synthesis reaction.

In the process of the present invention the fluid solids technique may be applied to particular advantage, finely divided carbonized synthesis catalyst being circulated from a fluid synthesis reactor to a fluid decarbonizer where it may be contacted with the metal oxides of the invention in the fluidized state. The finely divided state and the intimate mixture of the fluidized carbonized catalyst and metal oxide greatly improves the contact between the reacting solids, facilitates temperature control and accelerates the decarbonization reaction.

Having set forth its general nature and objects, the invention will be best understood from the subsequent more specific description in which reference will be made to the accompanying drawing the single figure of which is a schematical illustration of a system suitable for carrying out a preferred embodiment of the invention.

Referring now to the drawing the system illustrated therein essentially comprises a fluid synthesis reactor 10, a decarbonizer 55 and a metal oxide reoxidizer 30, the functions and co-operation of which will be forthwith explained using the decarbonization of a carbonized iron type synthesis catalyst as an example. It should be understood, however, that the system of the drawing may be used in a generally analogous manner for the decarbonization of other synthesis catalysts.

In operation, synthesis reactor 10 contains finely divided iron catalyst such as reduced pyrites ash promoted with about 1.5% of potassium fluoride. However, other conventional iron catalysts of satisfactory activity and selectivity toward liquid products may be used. The catalyst may have a particle size of about 100–400 mesh and finer, preferably mostly about 200 to 400 mesh.

A synthesis gas mixture from any suitable source, having a ratio of $H_2:CO$ which may vary between the approximate limits of 0.5–3:1, is fed at a synthesis pressure of about 5–50, preferably 10–30, atmospheres through line 1 to enter reactor 10 through a distributing device such as grid 3 at a superficial velocity controlled within the limits of 0.3 to 10 ft. per second, preferably 0.5 to 3 ft. per second, so as to maintain the catalyst in the form of a dense, highly turbulent fluidized mass having a well defined upper level $L_{10}$. The position of level $L_{10}$ is a function essentially of the amount and specific gravity of the catalyst and the velocity and viscosity of the synthesis gas. The fluidized catalyst in the catalyst zone below level $L_{10}$ may have a density of about 15 to 150 pounds per cubic foot while the catalyst density above level $L_{10}$ may be as low as 0.05 pound per cubic foot. Any catalyst particles remaining suspended in the gaseous and vaporous reaction products and unreacted synthesis gas withdrawn upwardly from level $L_{10}$ may be separated in a conventional type centrifugal or electric gas-solids separator 12 and returned through a pipe 14 to the catalyst mass below level $L_{10}$.

As a result of the excellent heat transfer characteristics of the fluidized catalyst mass in reactor 10, the reaction temperature may be easily kept constant within a few degrees F. at the desired temperature level which for catalysts of the type here involved lies between the approximate limits of 500° and 800° F., preferably between about 550° and 700° F. Surplus heat of the exothermic reaction may be withdrawn and heat required for starting up the process may be supplied by any conventional heat transfer means (not shown).

Reaction gases and vapors substantially free of entrained catalyst fines are withdrawn from separator 12 through line 16 and passed to a conventional product recovery system (not shown).

In order to prevent excessive carbonization and catalyst disintegration within reactor 10 and to permit the maintenance of the favorable fluidization and reaction conditions specified above, the present invention provides for a catalyst treatment as follows. When the carbonization of the catalyst has reached the highest degree that may be tolerated without excessive disintegration of the catalyst particles, say a carbon content of about 10–30% by weight, fluidized catalyst is withdrawn from reactor 10 through a bottom drawoff well 18 and a conventional standpipe 20 which may be aerated through one or more taps 22. The catalyst flows through a slide valve 24 into line 26 wherein it is suspended in an inert gas such as steam, flue gas, or the like preheated preferably by means of heat exchanger 63 in heat exchange with catalyst returned from decarbonizer 55 to reactor 10 and/or by means of heat exchanger 40 in heat exchange with spent oxidizing gas withdrawn from reoxidizer 30 as will appear more clearly hereinafter.

Referring now to metal reoxidizer 30 a dense fluidized mass of a finely divided readily reducible metal oxide of the type specified above is maintained in oxidizer 30. For the purposes of the present example it is assumed that separation of the reduced metal oxide from decarbonized catalyst prior to the latter's return to reactor 10 is desirable. To facilitate this separation the metal oxide preferably has a larger average particle size than the catalyst withdrawn from reactor 10. Average metal oxide particle sizes of about 50–150 mesh are generally suitable when using the catalyst particle size specified in connection with reactor 10. An oxidizing gas such as steam, air, oxygen, or suitable mixtures of these gases, is supplied through lines 31 and/or 32 through a grid 34 to the bottom of reoxidizer 30 at a superficial velocity sufficient to fluidize the solids. Gas velocities of about 1 to 5 feet per second are usually adequate. The oxidation reaction within reoxidizer 30 is exothermic particularly when free oxygen-containing gases are used and conventional cooling means (not shown) may be provided for temperature control. The amount of oxygen supplied with the oxidizing gas may be readily so controlled as to reoxidize the metal oxide to the desired degree during its residence time within reoxidizer 30 at relatively high reoxidation temperatures of about 1400°–1800° F. depending on the metal oxide used. Spent oxidizing gas which may contain suspended metal oxide particles of small size is withdrawn overhead from level $L_{30}$ through line 36 and passed through separator 37, line 38 and heat exchanger 40 to vent 42. Heat exchanger 40 may serve to preheat inert gas supplied through line 26. Solids in separator 37 may be returned through line 44 to the metal oxide in reoxidizer 30 or discarded through line 46.

Reoxidized metal oxide is withdrawn through standpipe 48 aerated through one or more taps 50 and passed through slide valve 52 to gas line 26 wherein it is mixed with, and supplies additional heat to, the catalyst withdrawn from reactor 10. The amount of metal oxide added to line 26, of course, depends on the amount and degree of carbonization of the carbonized catalyst as well as on the degree of decarbonization desired. If $Fe_2O_3$ is used as the metal oxide and the carbon content of the catalyst is to be reduced from about 30% to about 5%, the amount of metal oxide may be about 1 to 3 pounds per pound of catalyst withdrawn from reactor 10.

The solids and gases in line 26 may after the addition of the metal oxide, attain a temperature say of about 1200°–1400° F. to support the decarbonization reaction in decarbonizer 55 and may then be passed directly to decarbonizer 55. However, if desired, additional heat may be added in any conventional manner by heater 53.

The suspension of carbonized catalyst and metal oxide in inert gas passes at the decarbonization temperature into decarbonizer 55 which is of enlarged cross-section. The superficial velocity of the gas within decarbonizer 55 is preferably so controlled that considerable slippage of solids against gas and violent turbulence of the solids within decarbonizer 55 are achieved at an approximate apparent density of the suspension of about 10–30 pounds per cubic foot, while all solids are ultimately carried overhead suspended in the gas in a manner commonly known as upflow operation of fluid reactors. As a result of the extremely intimate contact of the solids particles within decarbonizer 55 decarbonization of the catalyst and reduction of the metal oxide may be accomplished within a relatively short residence time of say about 10 to 100 minutes.

A dilute suspension of decarbonized catalyst and reduced metal oxide in inert gas is taken overhead from decarbonizer 55 and passed through line 57 to an elutriator or low efficiency gas-solid separator 59 wherein coarse reduced metal oxide particles are separated from the finer decarbonized catalyst particles. The coarse metal oxide particles are withdrawn from separator 59 through line 61 and returned to metal oxidizer 30 to be reoxidized therein as previously described. A dilute suspension of decarbonized catalyst in inert gas is passed overhead from separator 59 to reactor 10 through line 62 and heat exchanger 63 which may be used to preheat inert gas supplied to line 26 as mentioned above.

The system illustrated in the drawing permits of various modifications. Instead of using standpipes 20 and 48 for circulating solids as outlined above, other conventional means of conveying fluidized solids such as mechanical conveyors, lock hoppers, etc., may be employed in a manner obvious to those skilled in the art. Fresh, coarse metal oxide may be supplied through line 63 to reoxidizer 30 to make up for metal oxide losses in the form of fines withdrawn through line 46. Synthesis catalyst of undesirably small size may be withdrawn through line 67 from the system and fresh makeup catalyst may be supplied from line 69 through line 71 to oxidizer 30 and/or through line 73 to reactor 10.

The invention will be further illustrated by the following specific example.

In a synthesis reaction using a catalyst consisting of fused Fe, $Al_2O_3$, $K_2O$, $SiO_2$ in proportions roughly 95; 3; 1; and 1 parts by weight, carbon was allowed to accumulate to the extent of 35% by weight. With this carbonized catalyst was admixed $Fe_2O_3$ in the weight ratio of 1.8 to 1. Decarbonization was carried out at 1300° F. for 120 minutes during which time the carbon content of the original catalyst was reduced from 35% to 5% by weight.

While the foregoing description and exemplary operations have served to illustrate specific applications and results of the invention other modifications obvious to those skilled in the art are within the scope of the invention. Only such limitations should be imposed on the invention as are indicated in the appended claims.

I claim:

1. In the continuous production of valuable synthetic products by conversion of a synthesis gas containing carbon monoxide and hydrogen in synthesis proportions at synthesis conditions of temperature and pressure in the presence of a finely divided iron-type catalyst maintained in a conversion zone in the form of a dense, turbulent fluidized mass of solids, in which used fluidized carbon-containing catalyst is withdrawn from the conversion zone, decarbonized by oxidation and thereafter returned to said conversion zone, the improvement which comprises contacting said withdrawn catalyst in said decarbonization zone with a metal oxide which is reducible by carbon below the fusion temperature of said catalyst and which does not adversely affect said conversion, maintaining in said decarbonization zone a temperature conducive to the oxidation of the carbon on said catalyst to remove carbon from said catalyst in the form of carbon oxides, withdrawing a mixture of catalyst of reduced carbon content and reduced metal oxide from said decarbonization zone and returning at least a portion of said mixture to said conversion zone.

2. The process of claim 1 in which said carbon-containing catalyst and said metal oxide are maintained in said decarbonization zone as a turbulent mass of solids suspended in an upwardly flowing gas.

3. The process of claim 2 in which said gas is preheated to supply at least a portion of the heat required in said decarbonization zone.

4. The process of claim 1 in which said portion to be returned is cooled at least to said synthesis temperature prior to its return to said conversion zone.

5. The process of claim 3 in which said gas is preheated in heat exchange with said returning catalyst and with gaseous decarbonization products.

6. The process of claim 1 in which said metal oxide is $Fe_2O_3$ and said carbon-containing catalyst contains about 5–20% of oxygen by weight of its iron as iron oxide.

7. The process of claim 1 in which said decarbonization temperature is about 1200°–1400° F.

8. The process of claim 1 in which reduced metal oxide is separated from decarbonized catalyst by separating means based on a gravity differential prior to the return of said portion to said conversion zone.

9. The process of claim 1 in which metal oxide reduced in said decarbonization zone and separated from decarbonized catalyst is reoxidized in a reoxidation zone at a temperature substantially higher than said decarbonization temperature and heat required in said decarbonization zone is supplied in the form of sensible heat of reoxidized metal oxide.

10. In the regeneration of a catalyst carbonized in the catalytic conversion of carbon oxides with hydrogen to form valuable synthetic products the improvement which comprises contacting a metal oxide which is reducible by carbon at a temperature below the fusion point of said catalyst, with said carbonized catalyst at a temperature conducive to a reaction of the oxygen of said metal oxide with carbon on said carbonized catalyst to form carbon oxides, and converting at least a substantial proportion of said carbon into carbon oxides by said reaction to decarbonize said carbonized catalyst at least in part.

11. The process of claim 10 in which said metal oxide is selected from the oxides of chromium, molybdenum and vanadium.

12. The process of claim 10 in which said metal oxide is an oxide of copper.

13. In the regeneration of a finely divided iron-type catalyst carbonized and oxidized to contain about 5–20% by weight of oxygen in the conversion of carbon monoxide with hydrogen to form valuable synthetic products in the presence of a dense fluidized mass of iron-type catalyst, the improvement which comprises contacting said carbonized and oxidized catalyst in a decarbonization zone with a metal oxide reducible by carbon below the fusion temperature of said catalyst, and maintaining in said decarbonization zone a temperature conducive to the oxidation of carbon on said catalyst to remove carbon from said catalyst in the form of carbon oxides.

14. In the regeneration of a catalyst maintained in a conversion zone and carbonized in the conversion of carbon monoxide with hydrogen to form valuable synthetic products, the improvement which comprises withdrawing carbonized catalyst from said conversion zone, contacting said withdrawn catalyst in a decarbonization zone with a metal oxide which is reducible by carbon at a temperature below the fusion point of said catalyst and which does not adversely affect said conversion, at a temperature conducive to a reaction of the oxygen of said metal oxide with carbon on said carbonized catalyst to form carbon oxides, converting at least a substantial proportion of said carbon into carbon oxides by said reaction to decarbonize said carbonized catalyst and to reduce said metal oxide, at least in part, withdrawing a mixture of decarbonized catalyst and reduced metal oxide from said decarbonization zone and returning at least a portion of said mixture to said conversion zone.

15. The process of claim 14 in which said metal oxide is an iron group metal oxide.

16. The process of claim 14 in which said carbonized catalyst contains a minor proportion of oxygen bound to the active component of the catalyst.

17. The process of claim 14 in which said catalyst comprises a catalytically active metal component which is the same as the metal of said metal oxide.

18. The process of claim 17 in which said metal oxide comprises said catalyst in an oxidized state.

19. The process of claim 17 in which said catalyst is an iron-type catalyst and said metal oxide is an iron oxide.

20. The process of claim 14 in which said carbonized catalyst and said metal oxide are maintained in said decarbonization zone as a turbulent mass of solids suspended in an upwardly flowing gas.

21. The process of claim 14 in which a portion of said mixture is reoxidized in a separate oxidation zone.

ROBERT W. KREBS.

REFERENCES CITED

The following references are of record in the file of this patent:

UNITED STATES PATENTS

| Number | Name | Date |
| --- | --- | --- |
| 2,170,158 | Rennerfelt | Aug. 28, 1939 |
| 2,289,731 | Roelen | July 14, 1942 |
| 2,360,787 | Murphree | Oct. 17, 1944 |
| 2,400,075 | Claussen | May 14, 1946 |